United States Patent [19]

Otsubo et al.

[11] Patent Number: 5,168,776
[45] Date of Patent: Dec. 8, 1992

[54] SHIFT CONTROL SYSTEM AND METHOD FOR AUTOMATIC TRANSMISSIONS

[75] Inventors: Hideaki Otsubo; Kunihiro Iwatsuki; Hiromichi Kimura, all of Toyota, Japan

[73] Assignee: Toyota Jidosha Kabushiki Kaisha, Toyota, Japan

[21] Appl. No.: 650,031

[22] Filed: Feb. 4, 1991

[30] Foreign Application Priority Data

Feb. 5, 1990 [JP] Japan .................................. 2-25806

[51] Int. Cl.$^5$ .......................................... B60K 41/06
[52] U.S. Cl. ........................................ 74/858; 74/855
[58] Field of Search ................. 74/851, 855, 858, 874

[56] References Cited

U.S. PATENT DOCUMENTS

| | | | |
|---|---|---|---|
| 4,355,550 | 10/1982 | Will et al. ........................ | 74/858 X |
| 4,688,450 | 8/1987 | Hatashi et al. .................... | 74/858 X |
| 4,933,851 | 6/1990 | Ito et al. ........................... | 74/858 X |
| 5,038,287 | 8/1991 | Taniguchi et al. ................ | 74/858 X |
| 5,058,013 | 10/1991 | Iwatsuki et al. .................. | 74/866 X |

FOREIGN PATENT DOCUMENTS

| | | |
|---|---|---|
| 61-112846 | 5/1986 | Japan . |
| 63-93632 | 4/1988 | Japan ..................................... 74/858 |
| 63-115954 | 5/1988 | Japan ..................................... 74/858 |

*Primary Examiner*—Richard Lorence
*Assistant Examiner*—Benjamin Levi
*Attorney, Agent, or Firm*—Oblon, Spivak, McClelland, Maier & Neustadt

[57] ABSTRACT

A shift control system for use in an automatic transmission which is connected to an engine and capable of changing the output torque of the engine during a shift. The automatic transmission includes first and second transmission assemblies connected in series to each other and each having a plurality of rotary components. The shift control system comprises: a shift timing decider for deciding whether or not the upshift of the first transmission assembly is resultantly delayed relative to the downshift of the second transmission assembly, when the automatic transmission is to be upshifted in its entirety by the upshift of the first transmission assembly and the downshift of the second transmission assembly; an engine torque controller for controlling the output torque of the engine during the shift; and an output device for outputting an instruction signal to the engine torque controller to reduce the output torque of the engine if the shift timing decider decides that the upshift of the first transmission assembly is resultantly delayed relative to the downshift of the second transmission assembly.

10 Claims, 8 Drawing Sheets

FIG. 4

| SHIFT RANGE | C1 | C2 | Co | Bo | B1 | B2 | B3 | 2ND T.A. | 1ST T.A. | GEAR RATIO |
|---|---|---|---|---|---|---|---|---|---|---|
| P, N | | | | | | | | | | |
| R | ○ | ○ | ○ | | | | ○ | LOW | RW | |
| D 1 | ○ | | ○ | | | | × | LOW | 1ST | 2.804 |
| D 2 | ○ | | | ○ | × | | × | HIGH | 1ST | 1.977 |
| D 3 | ○ | | ○ | | × | ○ | | LOW | 2ND | 1.532 |
| D 4 | ○ | | | ○ | | ○ | | HIGH | 2ND | 1.080 |
| D 5 | ○ | ○ | ○ | | | ○ | | LOW | 3RD | 1.000 |
| D 6 | ○ | ○ | | ○ | | ○ | | HIGH | 3RD | 0.705 |

FIG. 7

|  |  | $D_1$ | $D_2$ |
|---|---|---|---|
| $\theta_7$ | | 0 | 7 |
| $\theta_6$ | | ↑ | 7 |
| $\theta_5$ | | | 7 |
| $\theta_4$ | H | | 6 |
|  | L | | 6 |
| $\theta_3$ | H | | 5 |
|  | L | | 5 |
| $\theta_2$ | H | | ↑ |
|  | L | | |
| $\theta_1$ | H | | |
|  | L | | |
| $\theta_0$ | H | | |
|  | L | | |

SPECIFIC REDUCTION OF ENGINE TORQUE
$50\% \times \dfrac{D_1}{7}$ OR $50\% \times \dfrac{D_2}{7}$

[DELAY OF 1ST T.A.]

[DELAY OF 2ND T.A.]

SHIFT CONTROL SYSTEM AND METHOD FOR AUTOMATIC TRANSMISSIONS

BACKGROUND OF THE INVENTION

The present invention relates to a shift control system for an automatic transmission which is equipped with first and second transmission assemblies arranged in tandem on a power train and enabled to execute the change and control of engine torque during a shift.

Generally speaking, an automatic transmission is equipped with a reduction gear mechanism and a plurality of frictional engagement means and is enabled to achieve an arbitrary one of gear stages by operating a hydraulic control system to change the engaged states of the frictional engagement means selectively.

In recent years, there has been noted an automatic transmission which is equipped with first and second transmission assemblies to achieve a multiplicity of gear stages by switching the first and second transmission assemblies simultaneously or alternately. For example, an automatic transmission, which is equipped with a first transmission assembly capable of switching forward three stages and a second transmission assembly capable of switching forward two states, can execute forward six speed stages.

For shifting this automatic transmission, the individual frictional engagement means of the first and second transmission assemblies have to be simultaneously engaged or released. In this case, it is necessary to synchronize the switching operations of the individual frictional engagement means properly. If the switching operations of the frictional engagement means go out of synchronism when the automatic transmission is to be upshifted in its entirety, there may arise the following phenomena: the rotational states of the individual rotary components begin to change to a downshift and then to an upshift; one transmission assembly comes into a downshift after the other transmission assembly has completed its upshift; and vice versa, that is to say, the downshift of one transmission assembly is completed prior to the beginning of the upshift of the other transmission assembly. As a result, the shifting feel is deteriorated.

In view of these defects, there has been proposed a technology for ending the upshift of a first transmission assembly and the downshift of a second transmission assembly, as disclosed in Japanese Patent Laid-Open No. 61-112846, for example, by sensing the instant, at which the rotational speed of the rotary components of the first transmission assembly is changed as the first transmission assembly is brought into an inertia phase by the supply of the oil pressure to the first transmission assembly in response to a shifting instruction, and by triggering the reductions of engine torque and the engagement pressure of the second transmission assembly gradually at the sensed instant.

It is, however, the fact at present that the actual shifts are not always ended simultaneously even by the aforementioned shift control. In this case, the shifting characteristics are seriously deteriorated: output shaft torque jumps, as shown in FIG. 8, in case the shift at the first transmission assembly delays; but the output shaft torque drops, as shown in FIG. 9, in case the shift at the second transmission assembly delays.

SUMMARY OF THE INVENTION

An object of the present invention is to suppress a temporary and abrupt increase in output shaft torque due to the delay of the upshift of the first transmission assembly when the automatic transmission is to be upshifted in its entirety by the upshift of the first transmission assembly and the downshift of the second transmission assembly.

Another object of the present invention is to suppress the temporary and abrupt increase in the output shaft torque by reducing engine torque in accordance with the delay of the upshift of the first transmission assembly.

Still another object of the present invention is to prevent the deterioration of the shifting feel by causing the engine torque once reduced to restore initial torque gradually in accordance with the ending situation of the first transmission assembly.

According to a feature of the present invention, therefore, there is provided a shift control system for use in an automatic transmission which is connected to an engine and capable of changing output torque of said engine during a shift and which includes first and second transmission assemblies connected in series to each other and each having a plurality of rotary components. The shift control system comprises: shift timing decision means for deciding whether or not the upshift of said first transmission assembly is resultantly delayed relative to the downshift of said second transmission assembly, when said automatic transmission is to be upshifted in its entirety by the upshift of said first transmission assembly and the downshift of said second transmission assembly; engine torque control means for controlling the output torque of said engine during the shift; and output means for outputting an instruction signal to said engine torque control means to reduce the output torque of said engine if said shift timing decision means decides that the upshift of said first transmission assembly is resultantly delayed relative to the downshift of said second transmission assembly.

In a shift control system according to another feature of the present invention, moreover, said shift timing decision means judges the extent of advance of the upshift of said first transmission assembly in terms of the fluctuation ratio of the numbers of revolution of the rotary components of said first transmission assembly and the extent of advance of the downshift of said second transmission assembly in terms of the fluctuation ratio of the numbers of revolution of the rotary components of said second transmission assembly, whereby said shift timing decision means decides the delay of the upshift of said first transmission assembly relative to the downshift of said second transmission assembly on the basis of the fluctuation ratios of said numbers of revolution.

In a shift control system according to another feature of the present invention, said output means judges the instant for ending the reduction of the output torque of said engine on the basis of the number of revolution of any of said rotary components and outputs the instruction signal for augmenting the output torque of said engine gradually to an initial torque on the basis of the number of revolution of said rotary member.

According to a further feature of the present invention, there is provided a shift control method for use with an automatic transmission which is connected to an engine and capable of changing output torque of said engine during a shift and which includes first and second transmission assemblies connected in series to each other and each having a plurality of rotary components. The shift control method comprises: a first step of deciding whether or not the upshift of said first transmission assembly is resultantly delayed relative to the downshift of said second transmission assembly, when said automatic transmission is to be upshifted in its entirety by the upshift of said first transmission assembly and the downshift of said second transmission assembly; and a second step of reducing the output torque of said engine if it is decided at said first step that the upshift of said first transmission assembly is resultantly delayed relative to the downshift of said second transmission assembly.

In a shift control method according to a further feature of the present invention, said second step judges the instant for ending the reduction of the output torque of said engine on the basis of the number of revolution of any of said rotary components and outputs the instruction signal for augmenting the output torque of said engine gradually to an initial torque on the basis of the number of revolution of said rotary member.

The above and further objects and novel features of the present invention will more fully appear from the following detailed description when the same is read in connection with the accompanying drawings. It is to be expressly understood, however, that the drawings are for the purpose of illustrations only and are not intended as a definition of the limits of the invention.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 4 is a clutch and brake application chart enumerating the engaged states of the individual frictional engagement means of the automatic transmission;

FIG. 7 is a chart showing an example of the map of torque variables $D_1$ and $D_2$.

DETAILED DESCRIPTION OF THE PREFERRED EMBODIMENT

Figure 1:
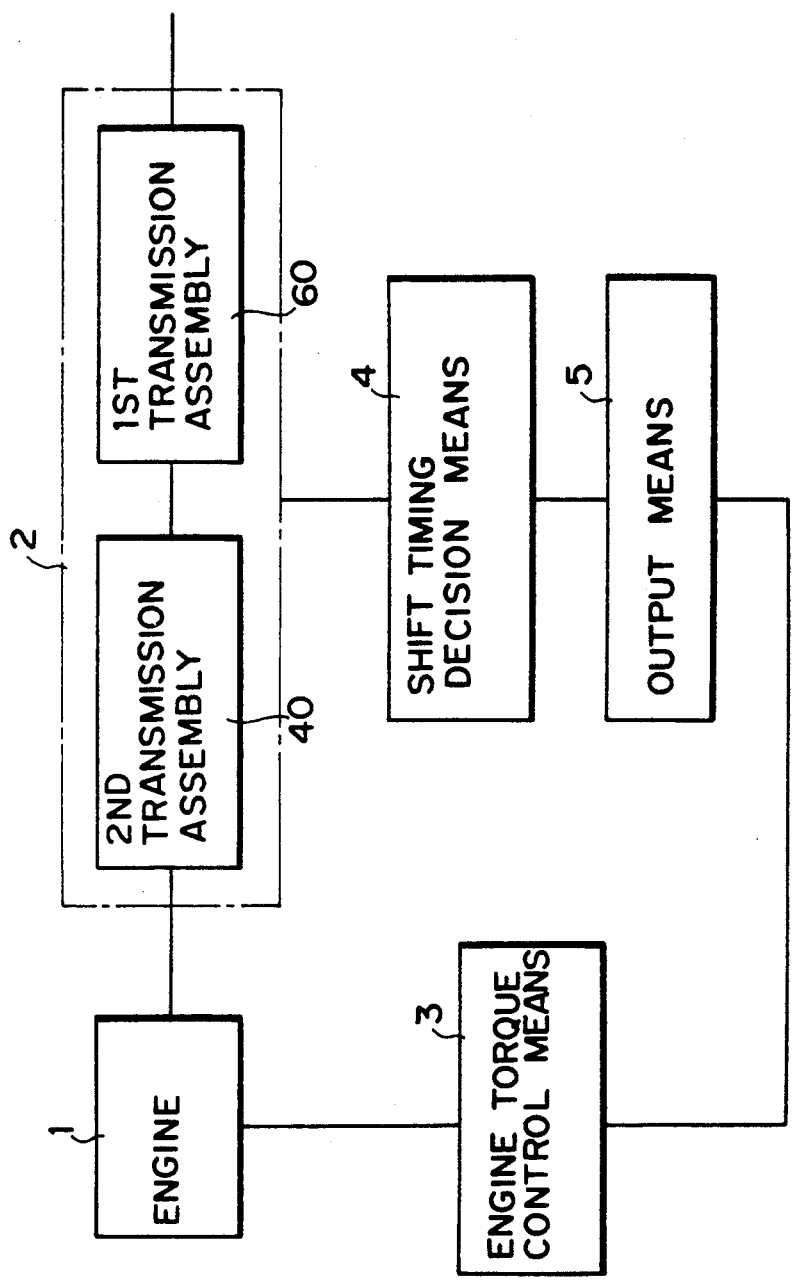
FIG. 1 is a block diagram showing the gist of the present invention.

As shown in FIG. 1, an automatic transmission 2 is connected to an engine 1 and is equipped with a first transmission assembly 60 and a second transmission assembly 40. The first transmission assembly 60 is enabled to set three gear stages, for example, as the forward ones, and the second transmission assembly 40 is enabled to set at least two gears, i.e., low and high gear stages. Moreover, the second transmission assembly 40 is connected to the engine 1, and the first transmission assembly 60 is connected in series to the second transmission assembly 40. Thus, the automatic transmission 2 is enabled to set forward six gear stages.

A shift control system is used to control not only the shift of the automatic transmission 2 but also torque of the engine 1. This shift control system is equipped with engine torque control means 3, shift timing decision means 4 and output means 5.

The engine torque control means 3 is provided for controlling engine torque electrically, for example, and can be exemplified by means for changing the ignition timing and/or the fuel injection rate electrically.

The shift timing decision means 4 decides the shift timings of the first and second transmission assemblies 60 and 40 when the overall shift of the automatic transmission 2 is to be achieved by the shifts at the first transmission assembly 60 and the second transmission assembly 40.

The output means 5 outputs an instruction signal to the engine torque control means 3 to reduce the engine torque or to return the engine torque to an initial level. If, at an upshift, it is decided by the shift timing decision means 4 that the upshift of the first transmission assembly 60 is resultantly delayed from the downshift of the second transmission assembly 40, the output means 5 outputs the instruction signal for reducing the engine torque to the engine torque control means 3. The output means 5 also outputs an instruction signal for restoring the initial torque gradually at the end of the shift in accordance with the shift ending situation.

Figure 8A:
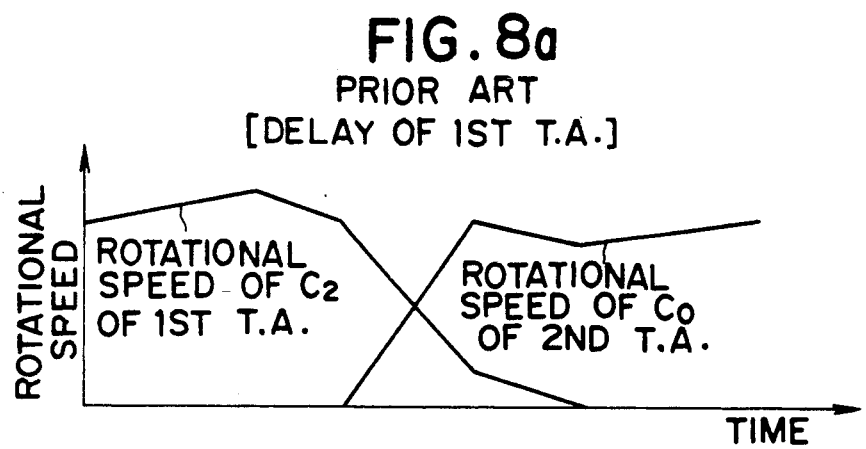
FIGS. 8a & b and 9a & b are diagrams showing the defects to be caused if the shift endings of the first and second transmission assemblies fail to synchronize, respectively.
Figure 8B:
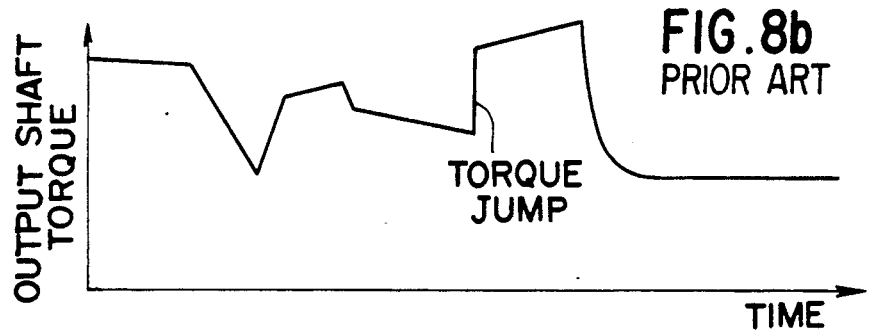

In case the automatic transmission 2 shown in FIG. 1 is to be upshifted in its entirety by upshifting the first transmission assembly 60 and downshifting the second transmission assembly 40, output shaft torque will jump, i.e., increase temporarily abruptly, as shown in FIG. 8, if the shift of the first transmission assembly 60 is delayed. The mechanism for causing this torque jump will be described in the following. Inertia torque is absorbed as the low-gear shift of the second transmission assembly 40 proceeds. However, this absorption is interrupted at the end of the shift of the second transmission assembly 40 so that the inertia torque appears as the abrupt rise of the output shaft torque.

In order to solve this problem, it is sufficient to reduce the engagement pressure (or torque capacity) of the first transmission assembly 60 simultaneously with the end of the shift of the second transmission assembly 40, because the level of the output shaft torque at this time is substantially dominated by the engagement pressure of the first transmission assembly 60. In case, however, the engagement pressure of the first transmission assembly 60 is merely reduced, the natural result is that the torque capacity itself for proceeding the shift of the first transmission assembly 60 is reduced. From this point, the shift proceeding rate itself of the first transmission assembly 60 is reduced to raise another problem that the shifting period is elongated. With this elongation, the frictional engagement means has its durability deteriorated, and still the worse only the upshift of the first transmission assembly 60 is continued for the long time to deteriorate the shifting feel.

Taking this point into consideration, in the present invention the input torque, i.e., the engine torque, which is to be applied to the automatic transmission 2, is reduced to an extent matching the reduction of the oil pressure of the first transmission assembly 60. If the reducing control of the engine torque is already executed somehow, the engine torque is further dropped to an extent matching the reduction of the engagement pressure of the first transmission assembly 60 when it is decided that the shift of the first transmission assembly 60 is resultantly delayed relative to the shift of the second transmission assembly 40.

Thus, output shaft torque can be prevented from jumping to reduce the shift shocks, while making it possible to end the shift quickly, without changing the shift proceeding rate of the first transmission assembly.

Figure 9A:
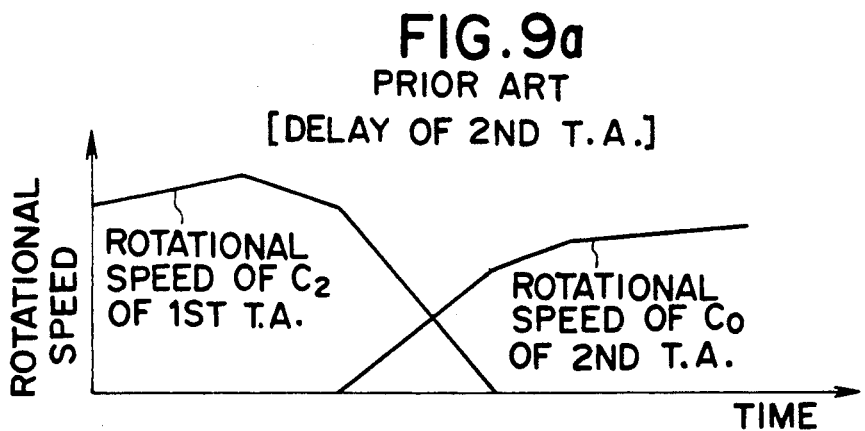
Figure 9B:
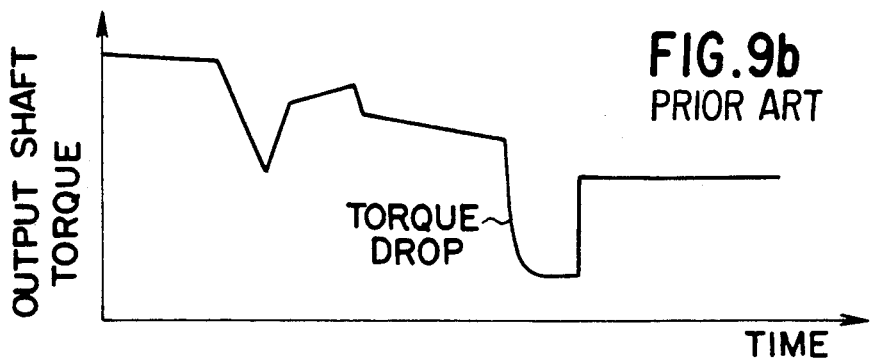

Incidentally, the present invention cannot cope with the case in which the shift of the second transmission assembly is delayed, as shown in FIG. 9. Despite of this fact, however, there arises no serious problem, if several factors or parameters are set to end the shift of the second transmission assembly earlier without fail by considering all dispersions and conditions, even if the shifts at the first and second transmission assemblies could not be simultaneously completed.

A more specific example will be described in the following.

Figure 3:
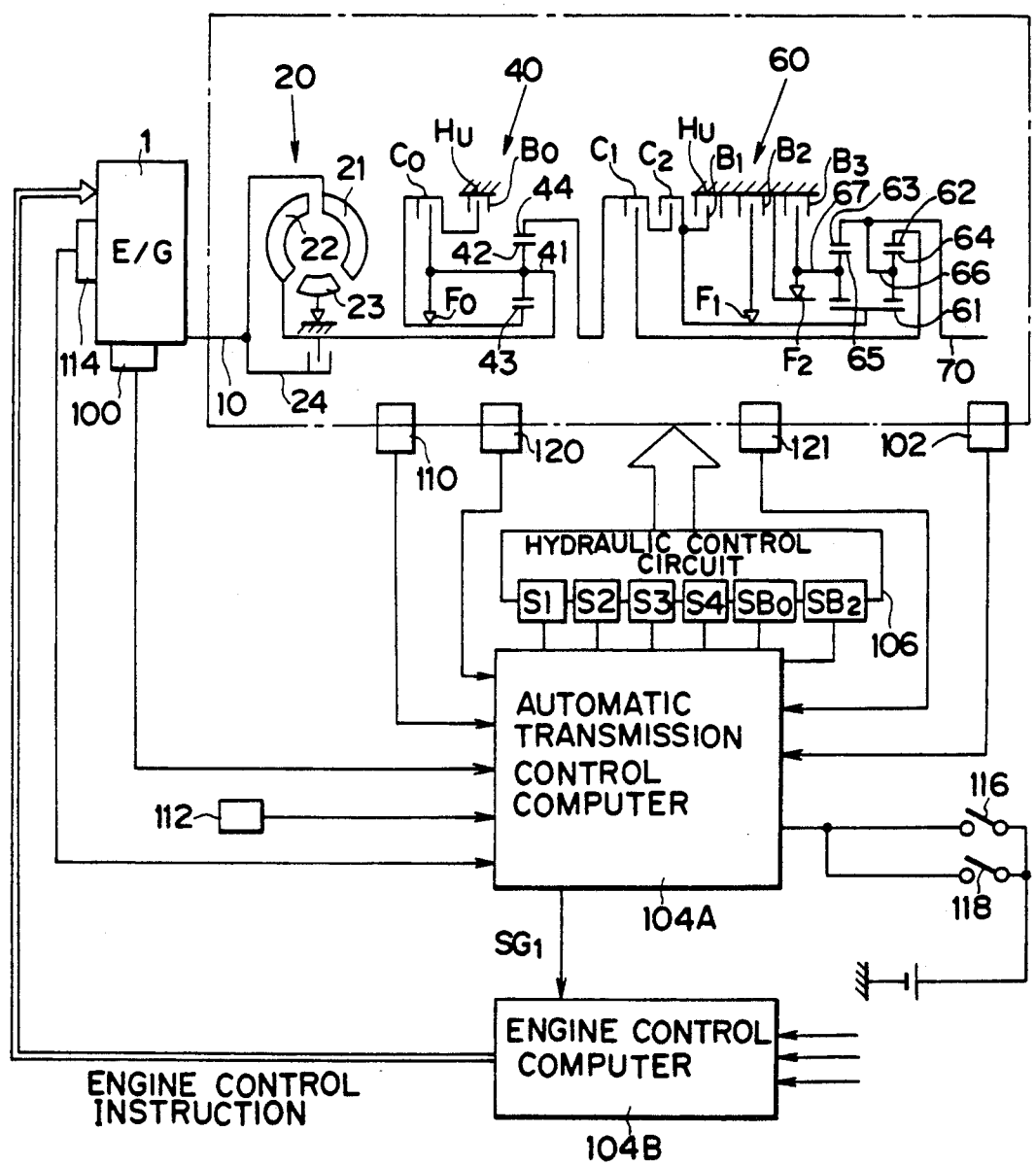
FIG. 3 is a schematic diagram showing the overall structure of a vehicular automatic transmission, to which the embodiment of the present invention is applied, and an engine.

FIG. 3 is a schematic diagram showing the whole structure of a vehicular automatic transmission according to the embodiment of the present invention.

This automatic transmission is equipped as its transmission mechanism with a torque converter 20, the second transmission assembly 40 and the first transmission assembly 60 having forward three stages and reverse one stage.

The torque converter 20 is composed of a pump 21, a turbine 22, a stator 23 and a lockup clutch 24. The pump 21 is connected to the crankshaft 10 of the engine 1, and the turbine 22 is connected to a carrier 41 of a planetary gear set of the second transmission assembly 40.

In this second transmission assembly 40, a planetary pinion 42 is rotatably supported by the carrier 41 and meshes with a sun gear 43 and a ring gear 44. Moreover, a clutch $C_0$ and a one-way clutch $F_0$ are interposed between the sun gear 43 and the carrier 41, and a brake $B_0$ is interposed between the sun gear 43 and a housing Hu.

The aforementioned first transmission assembly 60 is equipped with front and rear planetary gear sets. These planetary gear sets are individually composed of a shared sun gear 61, ring gears 62 and 63, planetary pinions 64 and 65, and carriers 66 and 67.

The ring gear 44 of the second transmission assembly 40 is connected through a clutch $C_1$ to the aforementioned ring gear 62. A clutch $C_2$ is interposed between the aforementioned ring gear 44 and sun gear 61. Moreover, the aforementioned carrier 66 is connected to the aforementioned ring gear 63, and these carrier 66 and ring gear 63 are connected to an output shaft 70. On the other hand, a brake $B_3$ and a one-way clutch $F_2$ are interposed between the aforementioned carrier 67 and housing Hu. A brake $B_2$ is interposed through a one-way clutch $F_1$ between the sun gear 61 and the housing Hu. A brake $B_1$ is interposed between the sun gear 61 and the housing Hu.

Since the automatic transmission is equipped with the transmission mechanism thus far described, solenoid valves $S_1$ to $S_4$ and electromagnetic proportion valves $SB_0$ and $SB_2$ in a hydraulic control circuit 106 are driven and controlled in accordance with preset shift patterns to effect the shift controls in combination of engagements of those individual clutches or brakes, as shown in FIG. 4, by an automatic transmission control computer 104A which is fed with the signals of a throttle sensor 100 for detecting the throttle opening reflecting the loading state of the engine 1 and a vehicle speed sensor 102 for detecting the vehicle speed.

In FIG. 4, symbols ◯ indicate that the corresponding clutch or brake is engaged, and symbols X indicate that the corresponding brake is engaged to effect the engine braking when the engine is driven by wheels.

Figure 5:
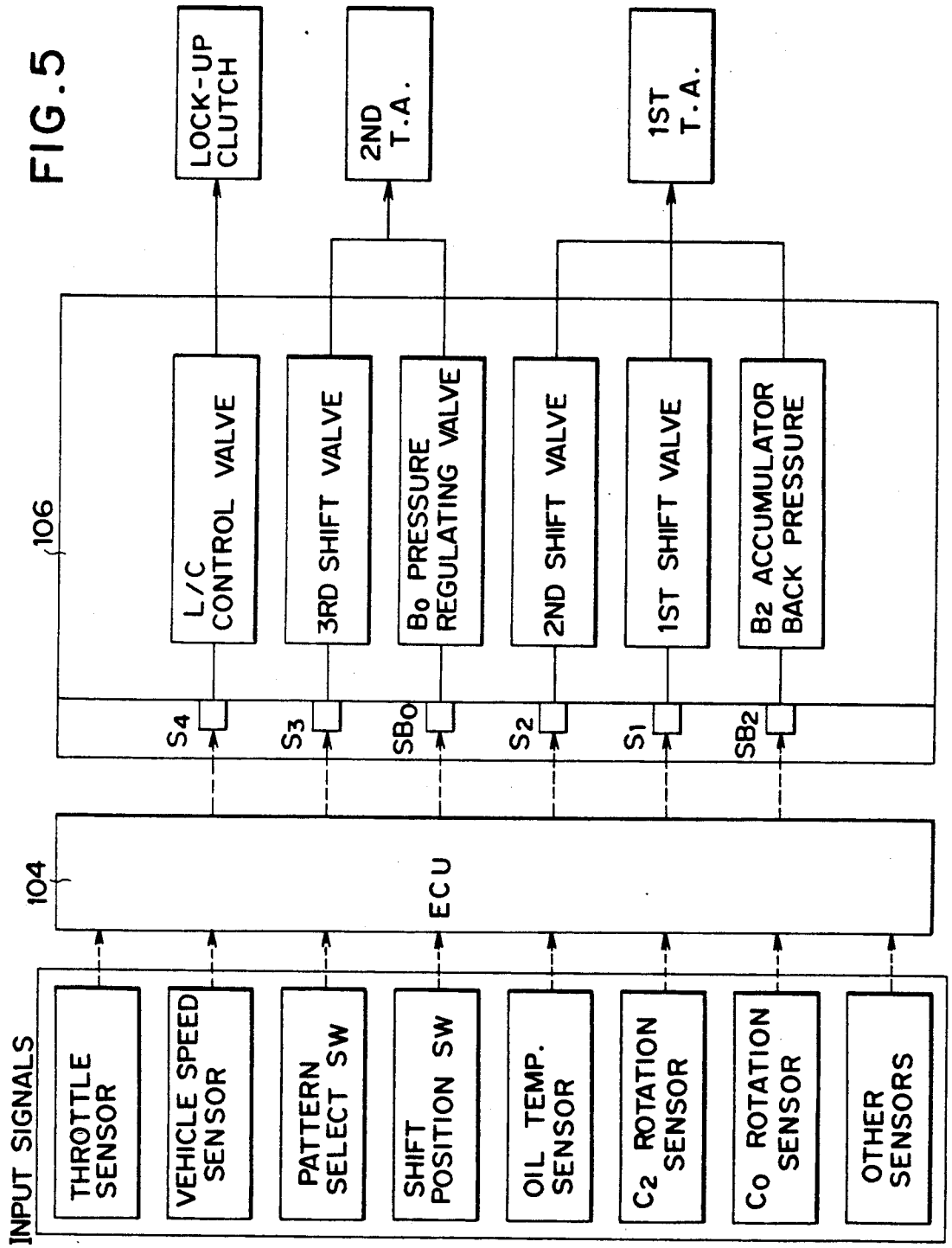
FIG. 5 is a block diagram showing the input/output relations of an automatic transmission control computer and a hydraulic control system for the automatic transmission.
Figure 6:
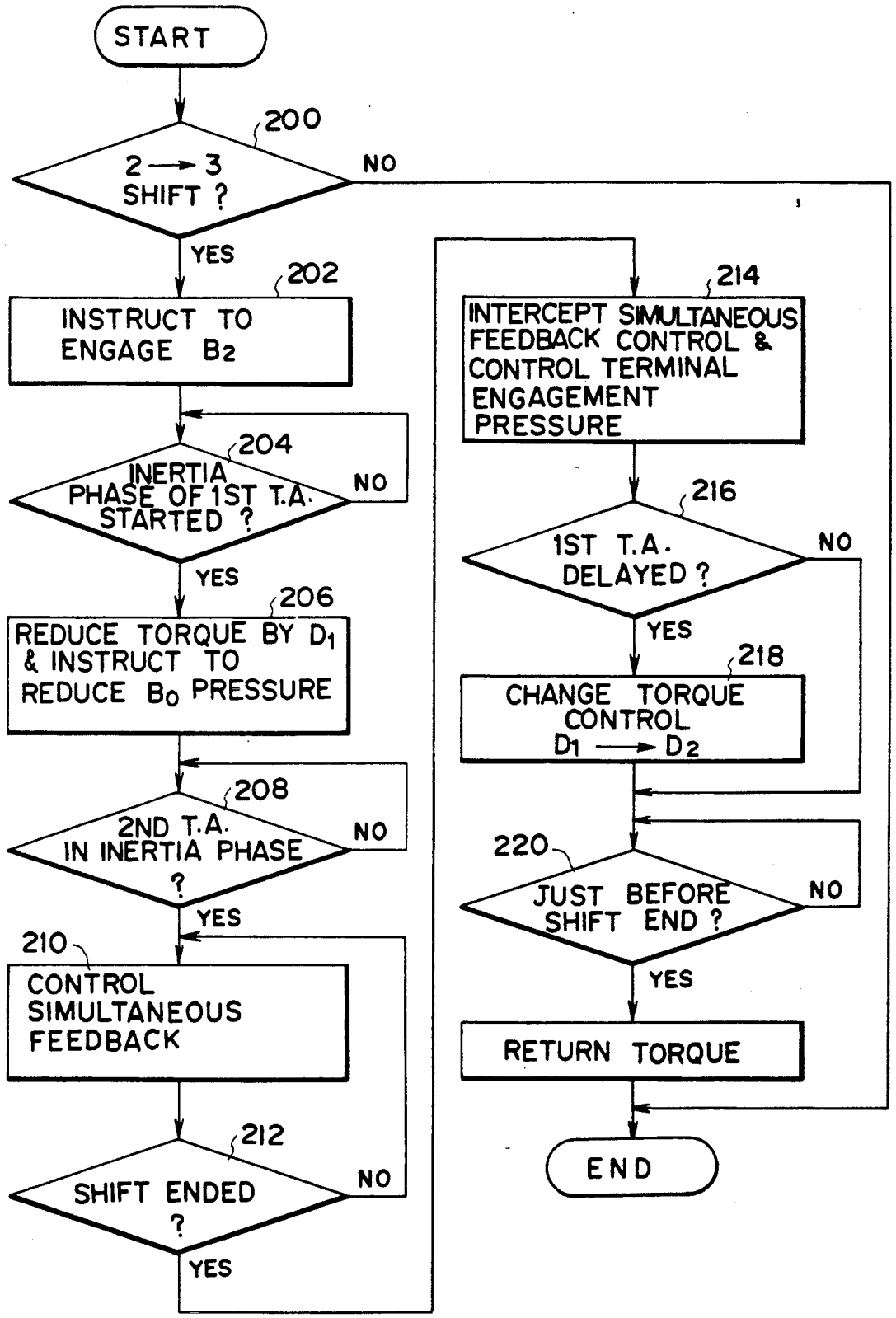
FIG. 6 is a flow chart showing a control flow to be executed in the system of the embodiment.

As shown in FIG. 5: the aforementioned solenoid valves $S_1$ and $S_2$ control the first and second shift valves for controlling the 1st to 3rd speed stages of the first transmission assembly 60; the aforementioned solenoid valve $S_3$ controls the third shift valve for switching to the high- and low-speed stages of the second transmission assembly 40; and the aforementioned solenoid valve $S_4$ controls the lockup clutch 24 of the torque converter 20.

On the other hand, the electromagnetic proportion valve $SB_0$ adjusts/controls the transient engagement pressure of the brake $B_0$ in accordance with the magnitude of the load current controlled by an electronic control unit 104. Likewise, the electromagnetic proportion valve $SB_2$ is enabled to adjust/control the transient engagement pressure of the brake $B_2$. Here will be omitted the description of the hardwares for the adjustments/controls of the engagement pressures of the individual electromagnetic proportion valves $SB_0$ and $SB_2$ because they are similar to those of the prior art.

In the automatic transmission according to this embodiment, as apparent from FIG. 4, the shifts between the 2nd and 3rd speeds, for example, are effected by operating the first transmission assembly 60 and the second transmission assembly 40 simultaneously and oppositely so that the shift shocks may probably be enlarged unless the synchronous controls are properly executed. At the shifts between the 2nd and 3rd speeds, therefore, the engagement forces of the corresponding frictional engagement components (i.e., the brakes $B_2$ and $B_0$) of the first transmission assembly 60 and the second transmission assembly 40 are adjusted/controlled by the electromagnetic proportion valves $SB_0$ and $SB_2$.

Incidentally, reference numeral 110 appearing in FIG. 3 designates a shift position sensor for detecting the shift positions such as N, D or R positions selected by the driver. Numeral 112 designates a pattern select switch for selecting the shift pattern such as an E (economic run) pattern or a P (power run) pattern. Moreover, numeral 114 designates a water temperature sensor for detecting the temperature of the cooling water of the engine, and numerals 116 and 118 designate brake switches for detecting the operations of a foot brake and a side brake, respectively.

In this embodiment, as shown in FIGS. 3 to 5, the aforementioned electronic control unit 104 is fed with not only the above-specified input signals but also the signal, which dictates the shift proceeding state of the first transmission assembly 60, of a $C_2$ sensor 120 for detecting the rotational speed of the drum of the clutch $C_2$, and the signal, which dictates the shift proceeding state of the second transmission assembly 40, of a $C_0$ sensor 121 for detecting the rotational speed of the drum of the clutch $C_0$.

On the other hand, the engine 1 has its fuel injection rate and ignition timing controlled by an engine control computer 104B. This engine control computer 104B is fed by the automatic transmission control computer 104A with a signal $SG_1$ for reducing the engine torque. On the basis of the instruction of the signal $SG_1$ fed from the automatic transmission control computer 104A, the engine control computer 104B controls the engine to reduce the engine torque.

Here, any conventional structure per se can be adopted for reducing the engine torque. For example, the ignition timing may be retarded, or the throttle valve may be closed. Alternatively, these tow concepts may be combined for reducing the engine torque.

Next, the operations of the system thus constructed will be described with reference to FIGS. 2 to 6.

Here will be presented as an example the shift from 2nd to 3rd speed stages, in which the automatic transmission is to be upshifted in its entirety by upshifting the first transmission assembly 60 and by downshifting the second transmission assembly 40.

If this shift is judged (as indicated at point a in FIG. 2) at Step 200, an instruction for engaging the brake $B_2$ of the first transmission assembly 60 (or for switching the solenoid $S_1$) is issued (as indicated at point b in FIG. 2) at Step 202 so as to start the shift of the first transmission assembly 60. Incidentally, the oil pressure of the brake $B_o$ of the second transmission assembly 40 is reduced for standby by the electromagnetic proportion valve $SB_o$ immediately before the brake $B_o$ begins to slide.

As the engagement pressure of the brake $B_2$ rises, the first transmission assembly 60 starts its shift to enter an inertia phase, in which the sun gear 61 of the first transmission assembly 60 is rotationally changed. This change is sensed at Step 204 by the $C_2$ sensor (as indicated at point c in FIG. 2) and is used (at Step 206) as the trigger to start the control of reducing the engine torque by $D_1$ and to reduce the engagement pressure of the brake $B_o$ of the second transmission assembly 40. Incidentally, this control of reducing the engine torque is that for improving the shifting characteristics accompanying the lightening of the load but not that for reducing the engine torque according to the present invention.

The control of reducing the engagement pressure of the brake $B_o$ in this case is carried out not by the shift valve but by the electromagnetic proportion value $SB_o$.

As the engagement pressure of the brake $B_o$ is dropped, the second transmission assembly 40 starts its shift to enter the inertia phase. If this entrance is detected at Step 208 (as indicated at point d in FIG. 2), the simultaneous feedback controls of the first and second transmission assemblies 60 and 40 by the electromagnetic proportion valves $SB_2$ and $SB_o$ are started (at Step 210). These simultaneous feedback controls are basically for synchronizing the progresses of the shifts of the first and second transmission assemblies 60 and 40.

The simultaneous feedback controls are executed till the end of the shifts is detected at Step 212. This detection is carried out by judging whether or not the later-specified formula (1) or a formula modified from the formula (1) by changing the value of a constant $\alpha_1$ holds. If the terminal of the shifts is detected (as indicated at point e in FIG. 2), the simultaneous feedback controls are interrupted at Step 214, and the terminal engagement pressure controls for reducing the shifting shocks are executed by reducing the engagement pressure of the brake $B_2$ at the shift terminal.

For the delay of the shift of the first transmission assembly 60, at STep 216, the shift terminal is detected, and the shift proceeding rate is checked. If it is resultantly decided that the shift of the first transmission assembly 60 is delayed relative to that of the second transmission assembly 40, the torque-down of the engine is changed from $D_1$ to $D_2$ at Step 218. These values $D_1$ and $D_2$ are mapped in accordance with the throttle opening $\theta$, as exemplified in FIG. 7.

The check of the shift proceeding rate at Step 216 is performed by deciding whether or not both the following formulas (1) and (2) hold:

$$INT\{N_{coei}/(N_{coei-1}-N_{coei})\} < \alpha_1 \quad (1)$$

and $$INT\{N_{coei}/(N_{coei-1}-N_{coei})\} < INT\{(N_{c2i}-\alpha tds)/(N_{c2i-1}-N_{c2i})\} \quad (2)$$

Figure 2:
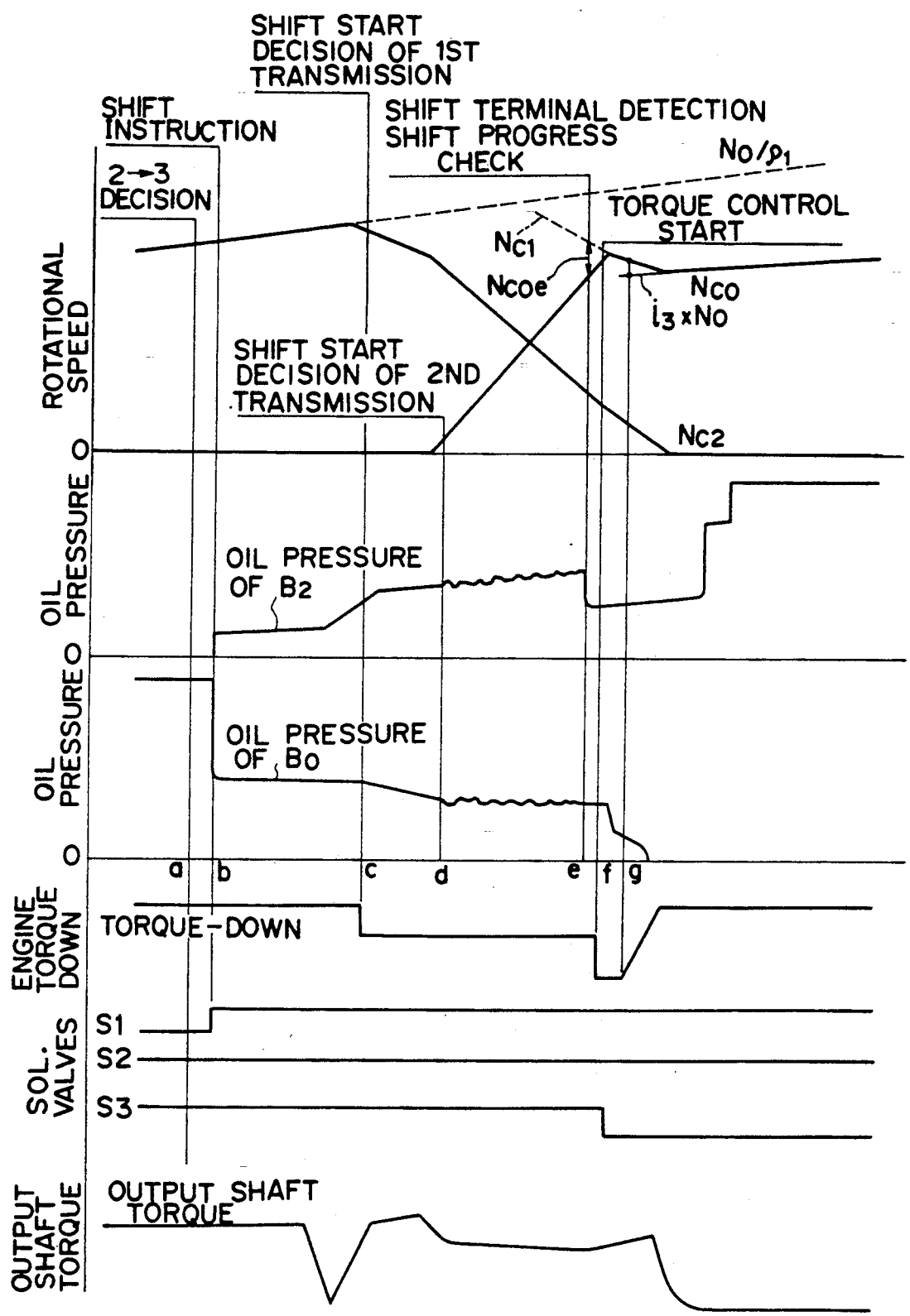
FIG. 2 is a diagram showing the shift transient characteristics according to an embodiment of the present invention.

In these formulas (1) and (2): $N_{coe}$ designates the difference (as shown in FIG. 2) between the rotational speed $N_{c1}$ of the clutch $C_1$ and the rotational speed $N_{co}$ of the clutch $C_o$. This value $N_{coe}$ is reduced to 0 if the second transmission assembly 40 is synchronized during the simultaneous shifts. The rotational speed $N_{c1}$ of the clutch $C_1$ can be determined from the rotational speed $N_{c2}$ of the clutch $C_2$ by a calculation of $(i_3 \times N_o + \rho_2 N_{c2})$. Here: $i_3$ designates the gear ratio at the 3rd speed; $N_o$ designates the rotational speed of the output shaft; and $\rho_2$ designates a constant determined from the gear train. How the value $N_{coe}$ is reduced for one sample period can be determined by calculating the values $N_{coe}$ sequentially and by calculating the difference of $(N_{coei-1}-N_{coei})$ between the preceding value $N_{coei-1}$ and the present value $N_{coei}$. What samples are required for the value $N_{coei}$ to reach 0 or for the second transmission assembly 40 to be synchronized is determined by dividing the value $N_{coei}$ by the difference $(N_{coei-1}-N_{coei})$. Incidentally, the letters INT appearing in the formulas (1) and (2) designate a function to take the integer of the quotient of the division.

On the other hand, what samples are required for the value $N_{c2}$ to reach 0 can be determined by accomplishing similar calculations for the rotational speed $N_{c2}$ of the clutch $C_2$.

In other words, the simultaneous holding of the two formulas (1) and (2) is interpreted to mean that the second transmission assembly 40 will be synchronized soon, namely, that it is predicted that the synchronization of the second transmission assembly 40 occurs at an earlier timing than the synchronization ($N_{c2}=0$) of the first transmission assembly 60.

Here, the reason for adding the constant $\alpha$ tds to the rotational speed $N_{c2}$ of the clutch $C_2$ of the first transmission assembly 60 will be described in the following. A slight advance of the second transmission assembly 40 will not exert serious influences upon the increase in the shifting shocks, but is judged such that the second transmission assembly 40 precedes by discarding the decimal point or less of the INT calculations, notwithstanding that the synchronizing timings of the first and second transmission assemblies 60 and 40 are very close to each other. According to this decision, the shifting shocks can be prevented from being deteriorated by executing the unnecessary controls of reducing the engine torque.

If it is decided at Step 216 that the aforementioned condition holds, the value for changing the engine torque is changed from $D_1$ to $D_2$ thereby to suppress the abrupt rise of the output shaft torque. If the delay is not detected, the change of the engine torque from $D_1$ to $D_2$ is not executed.

The reducing control of the engine torque is returned in accordance with the change in the rotational speed $N_{c2}$ of the clutch $C_2$, from the instant when it is judged at Step 212 that the following formula (3) holds:

$$N_{co} - i_3 N_o \leq \alpha_2 \qquad (3)$$

Specifically, this engine torque reducing control is performed to reduce the torque jump which is caused by the upshift of the first transmission assembly 60 after the end of the shift of the second transmission assembly 40 in case the shift of the first transmission assembly 60 is highly delayed relative to the shift of the second transmission assembly 40. Hence, it is naturally necessary that the return be completed at the instant of $N_{c2}=2$, namely, at the instant when the shift of the first transmission assembly 60 is ended (or the instant when the shift of the whole automatic transmission is ended). Since, however, it is actually difficult to accurately recognize the rotational speed of the rotary components in the vicinity of 0 rotation, namely, to accurately judge the instant just before the shift end in view of the rotational speed $N_{c2}$ of the clutch $C_2$, the value $N_{c2}$ is replaced by another value of $(N_{co} - i_3 N_o)$ so that the engine torque is returned according to the changing state of the substitute value $(N_{co} - i_3 N_o)$ after this value is smaller than the predetermined value $\alpha_2$.

As a result of the controls thus far described, the individual shifts of the first and second transmission assemblies 60 and 40 are accomplished under the simultaneous feedback controls with the engine torque being reduced by the value $D_1$ so that the shifts can be ended in sufficient synchronism.

Even if, moreover, the shift of the first transmission assembly 60 is delayed relative to that of the second transmission assembly 40 due to the various dispersions, the jump of the output shaft torque can be prevented to provide the satisfactory shifting characteristics at all times.

Incidentally, the structure for the present control is prepared for taking the correspondence even if the first transmission 60 is delayed relative to the second transmission assembly 40. Thus, satisfactory results can be attained if the various factors or parameters are preset to precede the second transmission assembly 40.

What is claimed is:

1. In an automatic transmission connected to an engine and capable of changing the output torque of said engine during a shift, said automatic transmission including first and second transmission assemblies connected in series to each other and each having a plurality of rotary components, a shift control system comprising:
   shift timing decision means for deciding whether or not an upshift of said first transmission assembly is resultantly delayed relative to a downshift of said second transmission assembly, when said automatic transmission is to be upshifted in its entirety by the upshift of said first transmission assembly and the downshift of said second transmission assembly;
   engine torque control means for controlling the output torque of said engine during the upshift or downshift, and
   output means for outputting an instruction signal to said engine torque control means to reduce an output torque of said engine if said shift timing decision means decides that the upshift of said first transmission assembly is resultantly delayed relative to the downshift of said second transmission assembly.

2. A shift control system according to claim 1, wherein said shift timing decision means judges the extent of advance of the upshift of said first transmission assembly in terms of a fluctuation ratio of the numbers of revolutions of the rotary components of said first transmission assembly and judges the extent of advance of the downshift of said second transmission assembly in terms of the fluctuation ratio of the numbers of revolutions of the rotary components of said second transmission assembly, whereby said shift timing decision means decides the delay of the upshift of said first transmission assembly relative to the downshift of said second transmission assembly on the basis of the fluctuation ratios of said numbers of revolutions.

3. A shift control system according to claim 1,
   wherein said first transmission assembly and said second transmission assembly individually include a planetary gear set and frictional engagement means, and
   wherein the rotary components of said second transmission assembly acting as an output component is selectively connected by said frictional engagement means to the rotary components of said first transmission assembly acting as an input component.

4. A shift control system according to claim 3, further comprising:
   a first sensor for detecting the number of revolution of any of the frictional engagement means of said first transmission assembly; and
   a second sensor for detecting the number of revolutions of any of the frictional engagement means of said second transmission assembly.

5. A shift control system according to claim 4, wherein said shift timing decision means judges the extent of advance of the upshift of said first transmission assembly on the basis of the number of revolutions detected by said first sensor and judges the extent of advance of the downshift of said second transmission assembly on the basis of the number of revolutions detected by said second sensor, whereby said shift timing decision means decides the delay of the upshift of said first transmission assembly relative to the downshift of said second transmission assembly on the basis of the fluctuation ratios of said numbers of revolutions.

6. A shift control system according to claim 1, wherein said output means judges the instant for ending the reduction of the output torque of said engine on the basis of the number of revolutions of any of said rotary components and outputs the instruction signal for augmenting the output torque of said engine gradually to an initial torque on the basis of the number of revolutions of said rotary components.

7. A shift control system according to claim 4,
   wherein said automatic transmission further includes an output shaft and a third sensor for detecting the number of revolutions of said output shaft, and wherein said output means judges the instant for ending the control of reduction of the output torque of said engine in terms of the number of revolutions detected by said second sensor and the number of revolutions detected by said third sensor and outputs the instruction signal for augmenting the output torque of said engine gradually to an initial torque in accordance with the number of revolutions detected by said second sensor.

8. In an automatic transmission connected to an engine and capable of changing the output torque of said engine during a shift, said automatic transmission including first and second transmission assemblies connected in series to each other and each having a plurality of rotary components,
  a shift control method comprising:
  a first step of deciding whether or not an upshift of said first transmission assembly is resultantly delayed relative to a downshift of said second transmission assembly, when said automatic transmission is to be upshifted in its entirety by the upshift of said first transmission assembly and the downshift of said second transmission assembly; and
  a second step of reducing the output torque of said engine if it is decided at said first step that the upshift of said first transmission assembly is resultantly delayed relative to the downshift of said second transmission assembly.

9. A shift control method according to claim 8, wherein said first step judges the extent of advance of the upshift of said first transmission assembly in terms of a fluctuation ratio of the numbers of revolutions of the rotary components of said first transmission assembly and judges the extent of advance of the downshift of said second transmission assembly in terms of the fluctuation ratio of the numbers of revolutions of the rotary components of said second transmission assembly, whereby a shift timing decision means decides the delay of the upshift of said first transmission assembly relative to the downshift of said second transmission assembly on the basis of the fluctuation ratios of said numbers of revolutions.

10. A shift control method according to claim 8, wherein said second step judges the instant for ending the reduction of the output torque of said engine on the basis of the number of revolution of any of said rotary components and outputs the instruction signal for augmenting the output torque of said engine gradually to an initial torque on the basis of the number of revolutions of said rotary components.

* * * * *